United States Patent [19]

Wolfe

[11] 3,952,322

[45] Apr. 20, 1976

[54] PHOTOGRAPHIC LIGHTING SYSTEM

[76] Inventor: Lester Wolfe, 870 United Nations Plaza, New York, N.Y. 10017

[22] Filed: Oct. 25, 1973

[21] Appl. No.: 409,626

Related U.S. Application Data

[63] Continuation-in-part of Ser. No. 185,237, Sept. 30, 1971, abandoned.

[52] U.S. Cl. ............................ 354/290; 240/1.3; 354/293
[51] Int. Cl.² ........................................ G03B 15/03
[58] Field of Search ................ 95/82, 83, 86, 12; 240/1.3, 1.4, 67, 68, 73 QD, 81 BA, 81 BC, 81 BD, 3, 9; 52/237, 250; 354/290, 291, 292, 293

[56] References Cited
UNITED STATES PATENTS

| 384,151 | 6/1888 | Gould | 95/82 |
|---|---|---|---|
| 1,831,152 | 8/1933 | Weisker | 240/1.3 |
| 1,923,741 | 8/1973 | Murdock et al. | 240/3 |
| 2,458,301 | 1/1949 | Reh | 240/1.3 X |
| 2,555,782 | 6/1951 | Brownstein | 52/637 |
| 2,575,461 | 11/1951 | Nolth | 52/637 |
| 3,032,148 | 5/1962 | Bank | 52/637 |
| 3,128,688 | 4/1964 | Coda | 95/83 |
| 3,516,343 | 6/1970 | Tunney | 95/82 |
| 3,604,913 | 9/1971 | Crete | 240/1.3 |
| 3,670,193 | 6/1972 | Thorington | 313/109 X |

*Primary Examiner*—L. T. Hix
*Assistant Examiner*—E. M. O'Connor
*Attorney, Agent, or Firm*—Smythe & Moore

[57] ABSTRACT

A plurality of vertical supporting members are upstanding from a base or support to define a parallepiped and adjustably support a plurality of horizontal supporting rods for providing a structure for enclosing an object to be photographed, the structure being adapted to position lighting means, camera means and related means relative to the object. The crossbeams can be removably mounted on said horizontal supporting rods for adjustably supporting lights, reflectors, cameras, objects to be photographed, and other accessories, such as roll curtains and backdrops. An elongated natural daylight source is preferred.

4 Claims, 14 Drawing Figures

PHOTOGRAPHIC LIGHTING SYSTEM

This invention relates to lighting and background for photographic purposes. This application is a continuation in part of Ser. No. 185,237, filed Sept. 30, 1971, now abandoned.

In some fields of photography, it is often necessary to photograph an object or a product. These objects are generally of sufficiently small size so that the photography can be carried out within a studio. Under these conditions, artificial lighting is required to illuminate the object properly. Such lighting generally comprises a dominant source of light and additional subsidiary sources of light, depending upon the configuration of the object. These sources of light may be obtained from a direct light or lights from variously positioned reflectors. The use of a structure to properly support an object to be photographed and to mount a number of lights, reflectors, backgrounds and cameras, etc., becomes rather involved. Further, since different arrangements of various objects are required, together with different lighting and backgrounds that photographing different objects requires many different arrangements.

One of the objects of the present invention is to provide an improved apparatus for enclosing an object to be photographed and to adjustably position lighting means, backgrounds, and camera means relative thereto.

Another of the objects of the present invention is to provide a simple yet effective structure for adjustably positioning photographic accessories commonly used in photographing objects.

Another of the objects of the invention is to provide an arrangement for facilitating daylight type illumination.

According to one aspect of the present invention, a photographic apparatus for positioning lighting means, cameras and an object to be photographed is provided and may comprise a plurality of vertical supporting means and horizontal supporting means adjustably positionable on the vertical supporting means to define a parallelepiped structure. Means are removably mounted on the horizontal supporting means for adjustably supporting lighting means, backgrounds, cameras and the object to be photographed. Various forms of horizontal and diagonal connecting members can be adjustably interconnected between the vertical supporting means to support the several lights or reflectors and surfaces which are required for properly lighting an object to be photographed. In a preferred form, natural daylight lamp means are used.

Other objects, advantages, and features of the invention will become apparent from the following description and drawings, which are merely exemplary.

In the drawings:

FIG. 10 is a fragmentary perspective view of an alternate form of boom connection;

FIG. 12 is a schematic elevation of a further manner of use of the invention;

Figure 1:
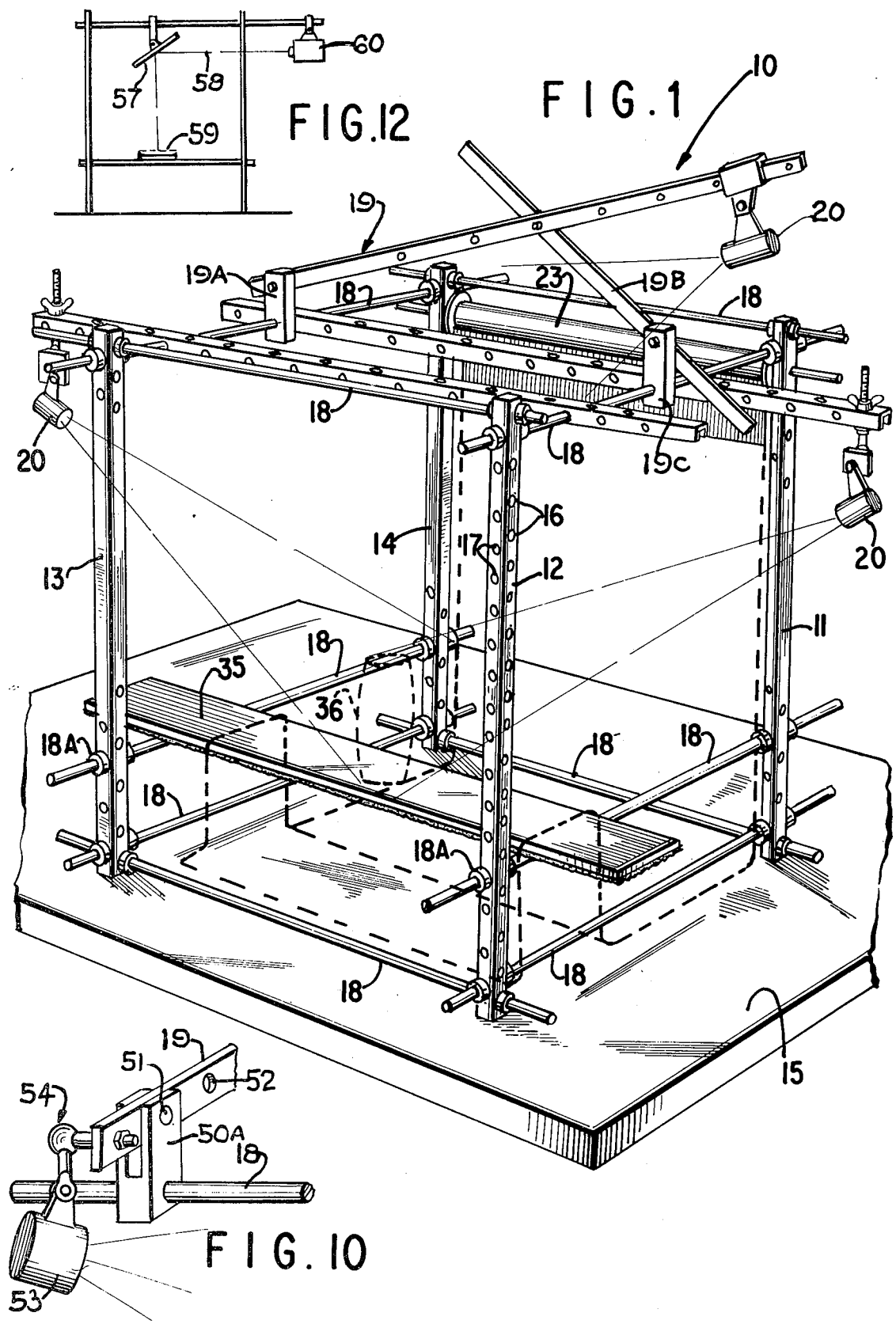
FIG. 1 is an overall perspective view of the photographic apparatus according to the present invention.

In FIG. 1, there is indicated generally at 10 a photographic apparatus according to the present invention. The apparatus comprises four vertical uprights 11, 12, 13 and 14 upstanding from a base 15. The uprights may be secured permanently to the base or may be removably mounted thereon by being inserted in holes in the base. The assembled structure also could merely be placed upon the base.

The uprights may be made of wood or of aluminum, and each upright may comprise a plurality of vertically spaced members having holes 16 passing transversely therethrough. The holes 16 are all parallel to each other and are substantially at right angles to similar holes 17 passing through the uprights and being spaced between the holes 16. The uprights 11 to 14 are arranged to form a parallelepiped and, in the embodiment of FIG. 1, are positioned to have a square base configuration, but can be other than square.

Aluminum or suitable material rods 18 having a circular cross-section are inserted through aligned openings between adjacent vertical uprights as shown in FIG. 1 to form horizontal supporting members, Suitable fastening means may be positioned on the rods 18, such as collars 18A, to secure the rods in position and to prevent them from sliding out of the upright holes.

One or more beams or booms 19 are removably mounted on spaced parallel horizontal rods 18 to provide a support for lights, such as indicated at 20 in FIG. 1, and for reflectors or a camera (not shown). Boom 19 can be carried in yoke 19A and beam 19B can be mounted in yoke 19C, the yokes being carried on spaced rods 18. Boom 19 can be adjustably positioned by beam 19B by choosing the desired holes to provide the desired angle and position.

Figure 2:
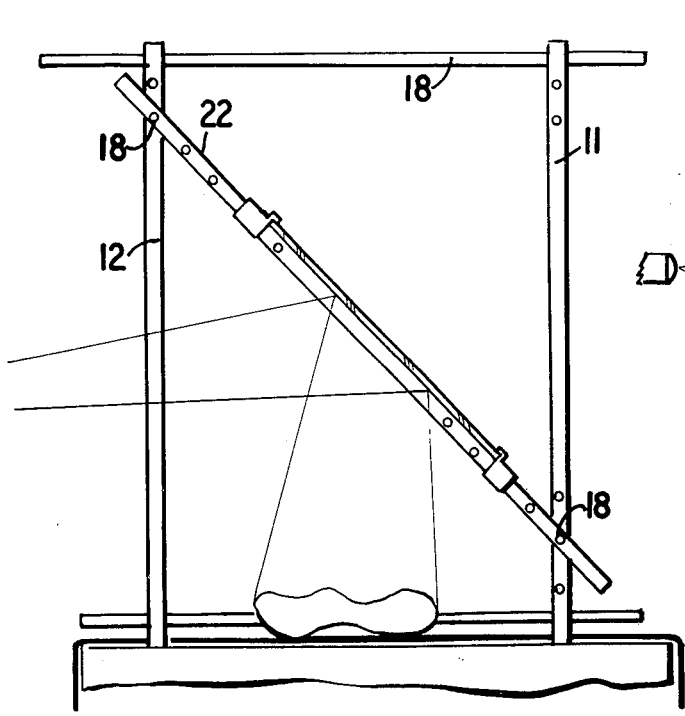
FIG. 2 is an elevational view of the apparatus of FIG. 1 and provided with a diagonal supporting strut.

As shown in FIG. 2, a diagonal supporting strut 22 may have openings therein into which are inserted the ends of rods 18.

Figure 3:
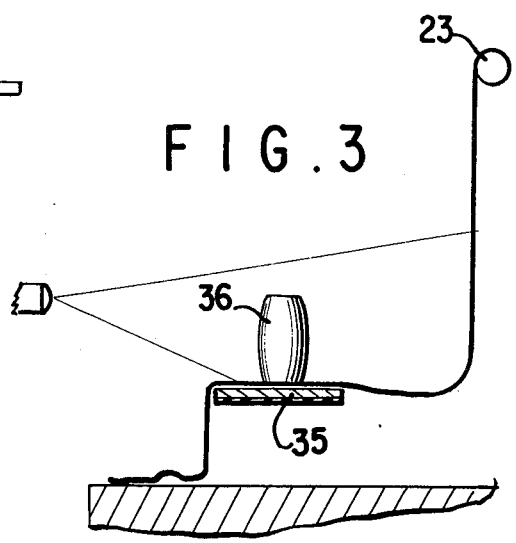
FIG. 3 is a vertical sectional view taken through the supporting platform of FIG. 1 and showing the object to be photographed with respect to a backdrop roll curtain.
Figure 8:
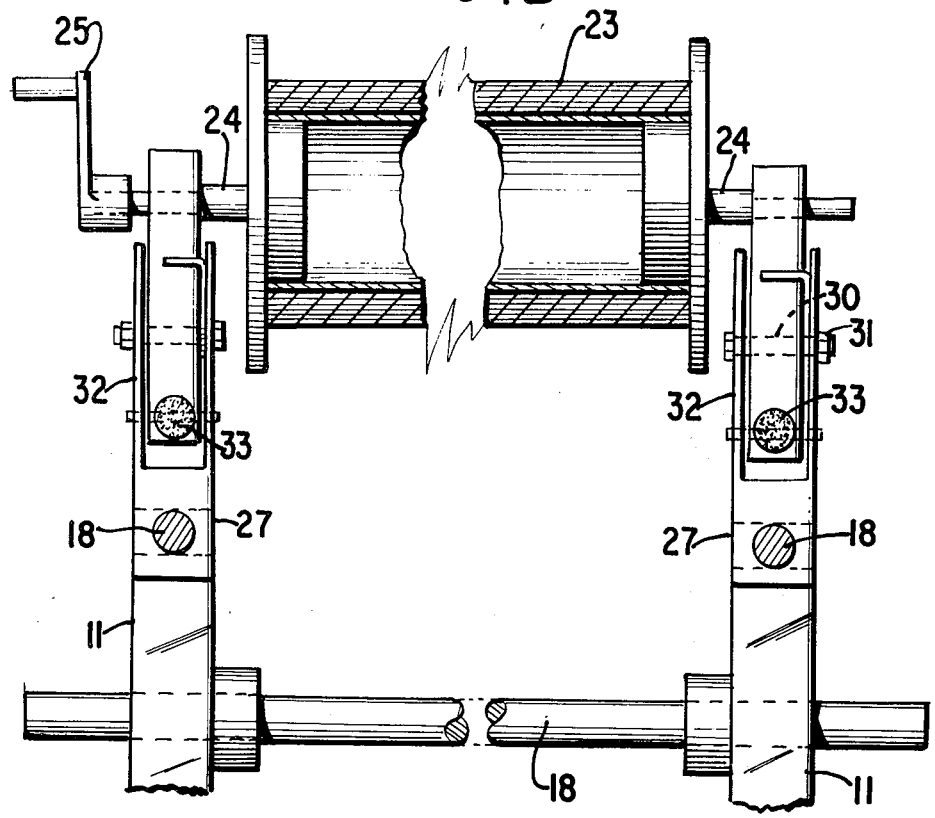
FIG. 8 is a front elevational view of a roll curtain mounted on yokes positioned on the top of vertical uprights.
Figure 9:
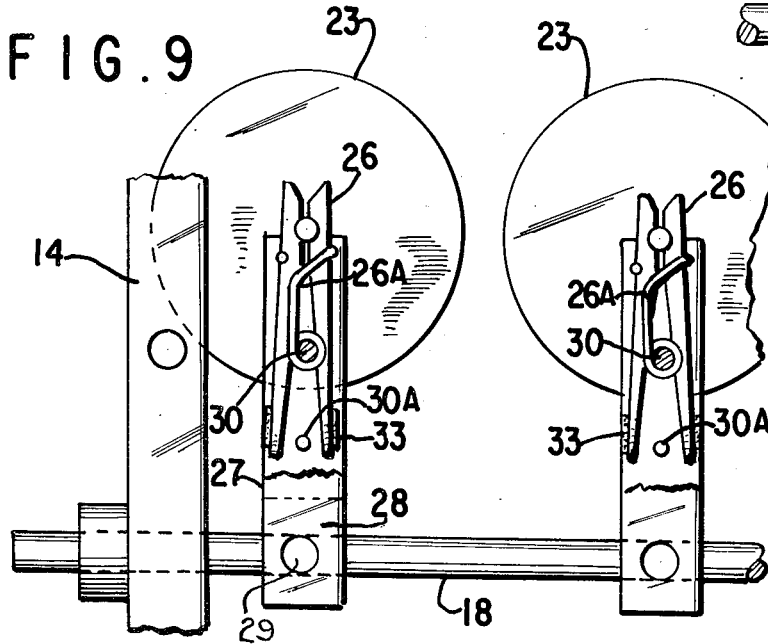
FIG. 9 is an end elevational view of the yokes and clips shown in FIG. 8.
Figure 11:
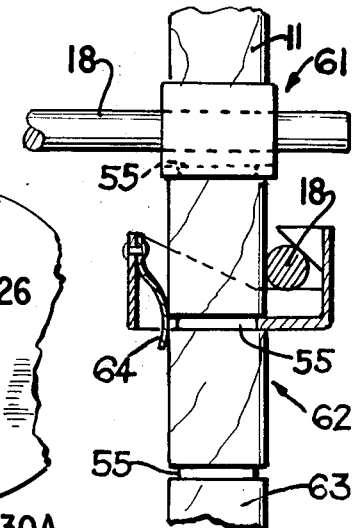
FIG. 11 is a side elevational view of an alternative form of fastener.

A roll curtain, such as 23 of FIGS. 1 and 3, may be positioned between a pair of uprights in a manner as shown in FIGS. 8 and 9. The curtain roll 23 is mounted on shafts 24 extending outwardly from the ends with a hand crank 25 being positioned on one shaft. The shafts 24 are positioned in spring clothespin-like clips 26, as may be seen in FIG. 9, with the clips being held in a yoke 27 having a solid base 28 with an opening 29 therethrough. The clothespin 26 is supported between the arms 32 of the yoke by means of an axle 30 having a nut 31 threaded on its end to pivotally mount the clothespin. Stops 30A serve to hold clothespin 26 in position. The clothespin is provided with pressure pads 33 on each of its legs to provide locations for squeezing the clothespin. The use of such a spring clip arrangement enables roll curtains of different material to be quickly mounted or removed and permits easy replacement of background curtains and easy raising or lowering of the curtain against spring clothespin friction. The spring clothespin function as spring brakes and maintain a pressure on the roll curtain axles except when the clothespins are pressed together. The springs 26A will functionally hold the shafts 24, the shafts being rotatable therein.

The yoke 27 may be mounted either on the top of an upright as shown in FIG. 8 or may be mounted on a horizontal rod 18 as shown in FIG. 9. By positioning a plurality of yokes along opposed parallel rods 18, it can be seen that a plurality of roll curtains 23 can be mounted adjacent each other to provide a variety of curtain backgrounds for the different objects to be photographed.

As may be seen in FIGS. 1 and 3, a wooden platform 35 is provided to support an object 36 which is to be photographed. The platform need not be attached to the horizontal rods 18 but may be provided with friction stops only.

Figure 4:
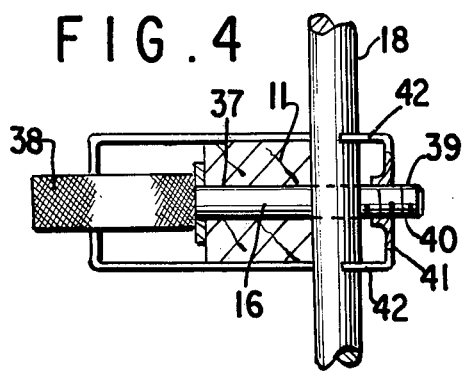
FIG. 4 is a horizontal sectional view taken through a vertical supporting member and showing a fastening arrangement for attaching horizontal rods to perforated vertical uprights.
Figure 5:
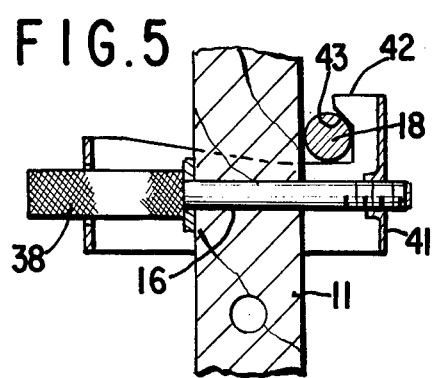
FIG. 5 is a side elevational view of the fastener shown in FIG. 4.

As may be seen in FIGS. 4 and 5, a rod 18 is attached to an upright 11 having openings 16. A threaded pin 37 having a larger diameter handle portion 38 is inserted into opening 16 so that its threaded end 39 is screwed into a threaded opening 40 formed in a yoke 41 having a pair of arms 42 notched at 43 to receive the rod 18. The handle 38 is then threaded to jam the yoke arms 42 tightly against the rod 18 which in turn is jammed against the upright 11.

Figure 6:
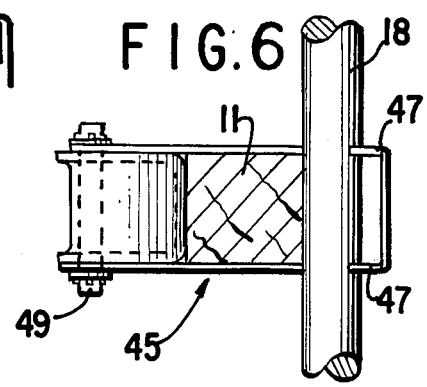
FIG. 6 is a view similar to that of FIG. 4 but showing a fastener for non-perforated vertical uprights.
Figure 7:
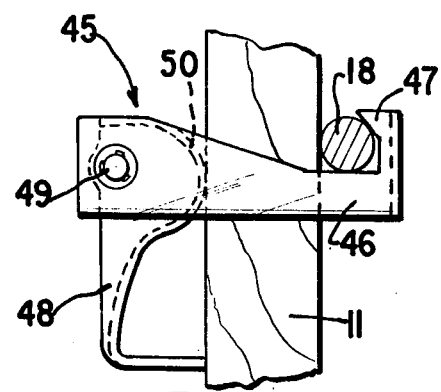
FIG. 7 is a side elevational view of the fastener of FIG. 6.

In FIGS. 6 and 7, there is illustrated a fastener generally indicated at 45 for securing a rod 18 to an upright 11 which is not perforated. The fastener 45 similarly comprises a yoke 46 having a pair of arms 47 notched to receive the aluminum rod 18 therein and to retain this rod against the face of upright 11. The other end of the yoke is provided with a handle 48 pivotally mounted at 49 and provided with an eccentric portion 50 which is engageable with the opposite face of the upright 11. Accordingly, after the rod 18 has been inserted into the notched arms of the yoke, the handle 48 is pushed downwardly or in a counter-clockwise direction so that the eccentric portion 50 tightly engages a face of the upright 11 to secure the rod 18 tightly against the upright.

If desired, the boom 19 can be supported in a yoke 50A (FIG. 10) mounted on horizontal support or rod 18. Pin 51 is removable so that the boom 19 can be removed or the pin 51 mounted in different apertures 52. In the form shown in FIG. 10, light 53 is supported on adjustable support means 54.

The vertical support may have indentations 55 for locating the supports 61, 62 on upright 63 for holding the rods 18. The support 61, 62 can have springs 64 for holding the supports in engagement with the indentation.

Mirror means 57 (FIG. 12) can be mounted and adjusted so that the camera optical axis 58 can be in a horizontal plane and the object 59 also in a horizontal plane. This will obviate the necessity of moving the camera 60 to an overhead position when photographing objects which may best be positioned on a horizontal surface, such as a necklace or any other yieldable object. Thus, in this instance, the camera is actually taking a picture of the image reflected in the mirror. Also, lighting means can be used which is directed upwardly.

Figure 13:
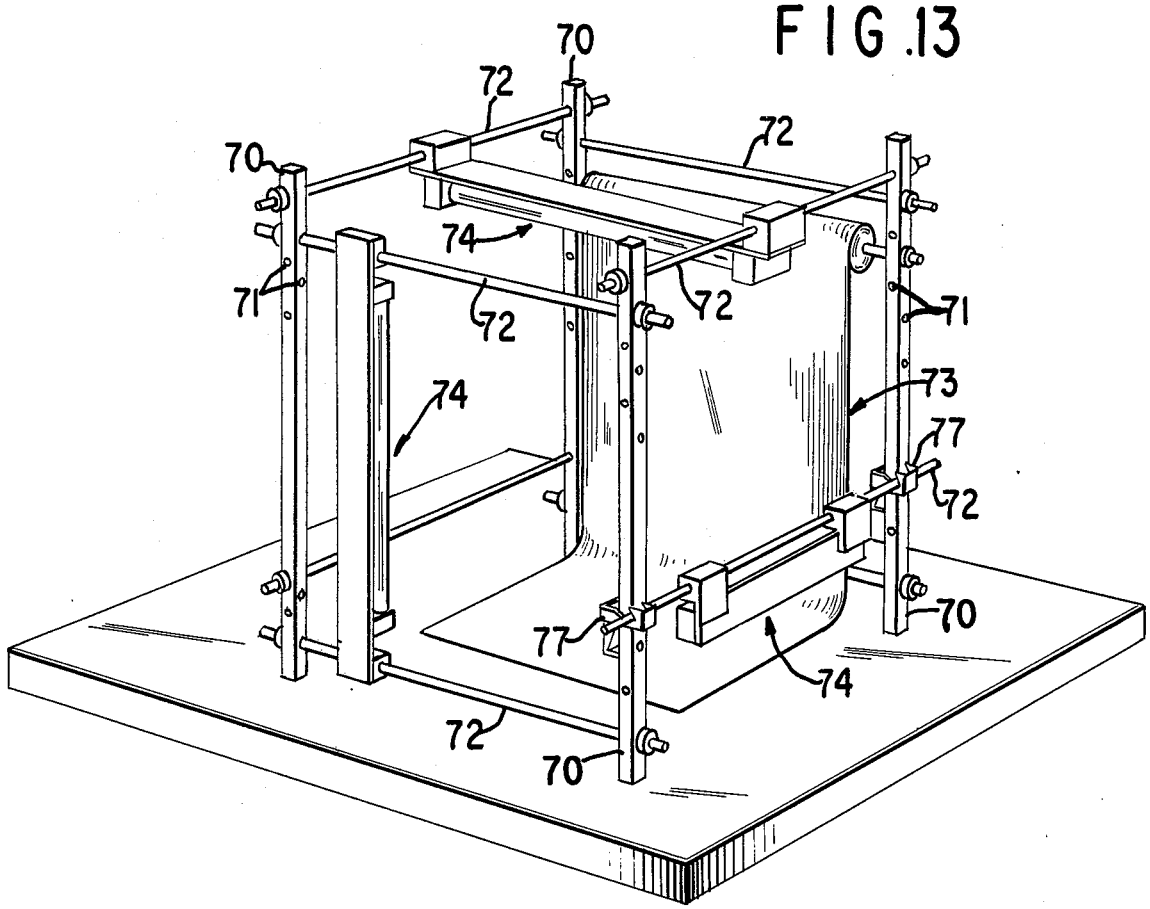
FIG. 13 is a perspective view of another form of the invention.

In order to facilitate photographing of certain objects, a natural daylight source has been found desirable. Such an arrangement is illustrated in FIG. 13. Vertical supports 70 have apertures 71 thereon for selectively receiving horizontal supports 72, the supports being releasably joined to each as desired. The right hand lamp can be supported on movable clamps 77 similar to the clamps or their equivalent seen in FIGS. 4 to 7. Curtain means 73 are similar to the curtain means of FIG. 1. Also, platform means (not shown) could be used.

Elongated natural daylight lamps shown generally at 74 are mounted on the vertical and horizontal supports so that they can adjustably slide thereon to provide the desired natural daylight lighting on the object to be photographed. The elongated lamps are movable in transverse and vertical directions relative to each other so as to obtain the desired lighting effect upon the object. Such is of particular importance when color photography is involved or the object is small and intricate in character.

In the form shown in FIG. 13, the lamps are mounted on bases carrying ballasts in the usual manner.

Figure 14:
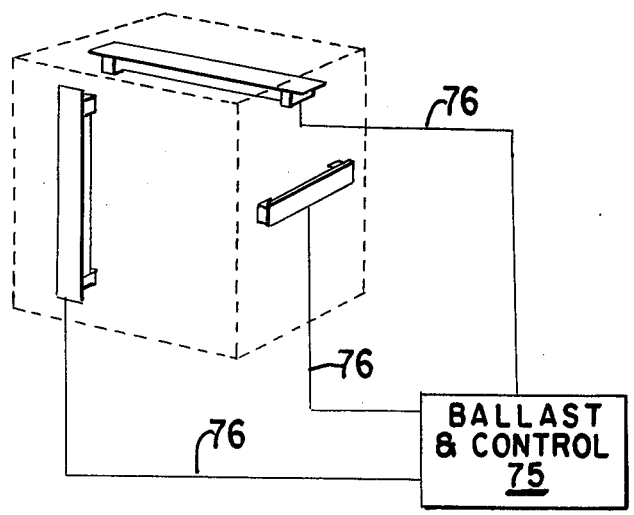
FIG. 14 is a schematic perspective view of a variation of FIG. 13.

It is also possible, as seen in FIG. 14, to have the ballasts in a central location 75 with suitable wires 76 connecting the same as needed. The wires and arrangement can be shielded as needed. Lamps can also be mounted on all sides of the structure.

One lamp suitable for use is described in U.S. Pat. No. 3,670,193.

CRI is the color rendering index measuring the color properties of the source related to the corresponding color temperature of a black body radiator or natural daylight. Generally, the number 100 represents the reference illuminant (black body or daylight) so the closer the CRI to 100, the more accurate a match to the reference illuminant the light source has.

Middle ultraviolet is defined as the ultraviolet portion of the natural daylight spectrum in the range of 290 – 320 nanometers, and near ultraviolet is the ultraviolet portion of the spectrum in the range of 320 – 380 nanometers.

A preferred elongated gaseous discharge fluorescent lamp produces light having a color closely approximating natural daylight and high color rendering index. It can have the following characteristics:

1. Color rendering index over 50 and preferably at least 80.
2. Middle ultraviolet range of 6 – 50 microwatts per lumen.
3. Near ultraviolet range between about 150 – 700 microwatts per lumen.
4. Radiant power ratio of near ultraviolet to middle ultraviolet radiation between about 8-40.
5. Total ultraviolet radiation per lumen same as in natural daylight of same correlated color temperature.

High pressure vapor lamps having the foregoing characteristics also could be used so that the term "gaseous discharge fluorescent lamp" is meant to cover the same.

Thus, it can be seen that the present invention shows a photographic apparatus which can be readily assembled or disassembled and which provides an infinite number of mounting positions for various photographic accessories such as lights, reflectors, backgrounds, cameras, and mounting platforms for objects to be photographed. The use of such an apparatus thus eliminates the need for possessing a large number of floor stands and mounts for lights and reflectors.

It will be understood that changes in various details of constructions and arrangement of parts may be made without departing from the spirit of the invention except as defined in the appended claims.

What is claimed is:

1. In a photographic structure for positioning lighting means, camera means, background material and an object to be photographed in preselected positions relative to each other, and the like, the combination of vertical and horizontal supports, and releasable means for holding the vertical and horizontal supports in various selected assembled parallelepiped relations, so that the supports can be quickly and adjustably assembled to enclose a relatively small object to be photographed in a fixed position within said assembled supports, a relatively small object fixedly mounted on said supports, means to adjustably support lighting means on said structure in fixed selected locations relative to the fixed object to be photographed within said structure to provide desired lighting thereof, lighting means mounted on said means to adjustably support lighting means, means to adjustably support in fixed position selected background roll curtain material on said structure relative to the object to be photographed in various preselected positions, and roll curtain means mounted on said means to adjustably support in fixed position selected background roll curtain material.

2. In a photographic structure for positioning lighting means, camera means, background material and an object to be photographed in preselected positions relative to each other, and the like, the combination of vertical and horizontal supports, and releasable means for holding the vertical and horizontal supports in various selected assembled parallelepiped relations, so that the supports can be quickly and adjustably assembled to enclose a relatively small object to be photographed in a fixed position within said assembled supports, a relatively small object fixedly mounted on said supports, elongated gaseous discharge fluorescent-type lamp means with natural daylight emitting properties, means to adjustably and slidably support said lighting means on said structure in fixed selected locations relative to the fixed object to be photographed within said structure, means to adjustably support in fixed position selected background roll curtain material on said structure relative to the object to be photographed in various preselected positions, and roll curtain means mounted on said means to adjustably support in fixed position selected background roll curtain material.

3. In a photographic structure as claimed in claim 2 wherein the lamp means has a color rendering index of at least 80 together with transmission of middle ultraviolet in the range of about 6 to 50 microwatts per lumen of visible light and about 150 – 700 watts of near range ultraviolet radiation per lumen of visible light and the radiant power ratio of near ultraviolet to middle ultraviolet radiation in the range of between 8 to 40 so that the quantity of ultraviolet radiation is approximately the same per lumen as in natural daylight of the correlated color temperature.

4. In a photographic structure as claimed in claim 2 wherein the lamp means are slidably mounted adjacent the ends thereof on said supports so that the lamp means can be adjusted to fixed positions to illuminate the object to be photographed.

* * * * *